United States Patent [19]

Moore

[11] Patent Number: 4,960,006
[45] Date of Patent: Oct. 2, 1990

[54] TURNING GEAR ENGAGEMENT DEVICE

[75] Inventor: James H. Moore, Schenectady, N.Y.

[73] Assignee: General Electric Company, Schenectady, N.Y.

[21] Appl. No.: 245,614

[22] Filed: Sep. 19, 1988

[51] Int. Cl.$^5$ .............................................. F16H 35/18
[52] U.S. Cl. ................................... 74/384; 60/39.141; 74/380; 74/405; 290/48; 290/52
[58] Field of Search ......................... 74/380, 384, 405; 60/39.141, 39.142, 709; 290/2, 48, 52, DIG. 1

[56] References Cited

U.S. PATENT DOCUMENTS

| | | | |
|---|---|---|---|
| 2,813,434 | 11/1957 | Stuebs | 74/384 |
| 3,021,719 | 2/1962 | Conrad, Jr. | 74/405 |
| 3,670,981 | 6/1972 | Cavella | 74/405 |
| 3,919,894 | 11/1975 | Keeter et al. | 74/384 |
| 3,943,786 | 3/1976 | Mills | 74/384 |
| 3,960,028 | 6/1976 | Martin | 74/405 |
| 4,154,144 | 5/1979 | Lyman | 74/405 |
| 4,430,575 | 2/1984 | Quigg | 74/384 |
| 4,507,926 | 4/1985 | Teckentrup et al. | 60/39.142 |

OTHER PUBLICATIONS

Stock; *IBM Technical Disclosure Bulletin;* "Switching Gear for Two Shafts"; vol. 15 No. 10; Mar. 1973.

Primary Examiner—Leslie A. Braun
Assistant Examiner—Sott Anchell
Attorney, Agent, or Firm—Nixon & Vanderhye

[57] ABSTRACT

A turning gear apparatus mounted adjacent the bull gear of a large turbomachine rotor has a carriage pivotably mounted to the frame, a first pinion rotatably mounted on the carriage, and a second pinion continuously engaging the first pinion and rotatably mounted to the frame coaxial with the carriage pivoting axis. The improvement comprises locating the carriage on the side of the bull gear where it rotates in an upward direction, with the axis of the second pinion located such that when the carriage is pivoted and the first pinion engages the bull gear, the axis of rotation of the first pinion is located on a selected angle below the horizintal substantially equal to the pressure angle of the bull gear tooth, resulting in substantially vertical reaction forces. Also in the preferred embodiment, the pivotable carriage is rendered bi-stable by disposing the first pinion above the second pinion and providing stops such that the pivotable turning gear carriage has a center of gravity which falls on either side of a vertical line through the pivot point and above the pivot point, when the carriage is positioned on the respective stops in the engaged or disengaged position.

9 Claims, 3 Drawing Sheets

TURNING GEAR ENGAGEMENT DEVICE

BACKGROUND OF THE INVENTION

This invention relates generally to large turbomachines; and, in particular, this invention relates to turning gears for steam turbine-generator units.

A turning gear is a motor-driven gear train, the primary function of which is to slowly roll a turbomachine rotor prior to starting the unit with steam and after shutdown to ensure that the rotor remains straight. A turbine rotor will cool unevenly if permitted to remain stationary for a period of time, and this may cause bowing to occur which would result in severe vibration and rubbing of stationary parts when the turbine is restarted. A secondary function of the turning gear is jogging a rotor to a new position during assembly, balance operations, and inspections.

A turning gear is actuated as a rotor coasts to a stop after a period of operation. A short time prior to a zero speed indication from the turbine, the turning gear motor is energized. When the zero speed indication is received, a turning gear pressurized fluid cylinder rotates a clash pinion carrier (carriage) to a position adjacent a bull gear on the turbine rotor. The clash pinion itself, rotated by the turning gear motor, through a gear train, is forced into mesh with the rotor bull gear.

A turning gear apparatus of the type described above is shown in U.S. Pat. No. 3,919,894 issued Nov. 18, 1975 to Keeter, et al., and assigned to the present assignee. The Keeter, et al., patent addressed the torque requirements to engage the clash pinion with the rotor bull gear by employing a small pre-engagement motor in tandem with the main turning gear motor. While this invention has been effective in reducing peak dynamic contact stresses in turning gears for large turbomachines, the very large forces involved in overcoming static friction in a stationary turbomachine rotor may result in structural damage to the turning gear assembly and damage to the gears because of misalignment due to movement and distortion of the turning gear housing Massive and rigid structures have been required to resist the reaction forces on the turning gear, and excessive power has been required to overcome the static friction in the rotor If the turning gear is located such that the drive pinion force on the bull gear adds to the downward force on the rotor bearing, the magnitude of the breakaway torque is even greater.

Accordingly, one object of the present invention is to provide an improved turning gear engagement mechanism in which the static friction due to the weight of the turbomachine rotor is decreased.

Another object of the invention is to provide an improved turning gear engagement device, in which the total force on the pinion carriage is reduced and which improves the distribution of force on the pinion carriage, thus requiring a less massive structure.

Still another object of the invention is to provide an improved turning gear engagement device which reduces the necessary power to turn the same size rotor.

DRAWINGS

The invention, both as to organization and method of practice, together with further objects and advantages thereof, will best be understood by reference to the following description, taken in connection with the accompanying drawings, in which:

FIG. 1 is a horizontal elevation drawing, partly in section, of a prior art turning gear, FIG. 2 is an enlarged elevation drawing of the carriage and gears of the prior art turning gear, FIG. 3 is an end elevation view, partly in section, of the turning gear engagement device according to the present invention, FIG. 4 is an enlarged end elevation view of the carriage and gears of FIG. 3 shown in engaged position, and FIG. 5 a view similar to FIG. 4, shown in the disengaged position.

SUMMARY OF THE INVENTION

Briefly stated, the invention is practiced by providing a turning gear apparatus with a stationary frame mounted adjacent the bull gear of a large turbomachine rotor, a carriage pivotably mounted to the frame, a first pinion rotatably mounted on the carriage, a second pinion continuously engaging the first pinion and rotatably mounted to the frame coaxial with the carriage pivoting axis, a gear train mounted to the frame and engaging the second pinion, a turning gear motor for rolling the turbomachine rotor through the gear train and first and second pinions, wherein the improvement comprises locating the carriage on the side of the bull gear where it rotates in an upward direction, with the axis of the second pinion located such that when the carriage is pivoted and the first pinion engages the bull gear, the axis of rotation of the first pinion is located on a selected angle below the horizontal, such that the reaction forces upward on the bull gear rotor and downward on the frame are substantially vertical. In the preferred embodiment, this selected angle is substantially equal to the pressure angle of the bull gear tooth. Also in the preferred embodiment, the carriage is rendered bi-stable by disposing the first pinion above the second pinion and providing stops such that the pivotable turning gear carriage has a center of gravity which falls on either side of a vertical line through the pivot point and above the pivot point, when the carriage is positioned on the respective stops in the engaged or disengaged position.

DESCRIPTION OF THE PREFERRED EMBODIMENT

Figure 1:
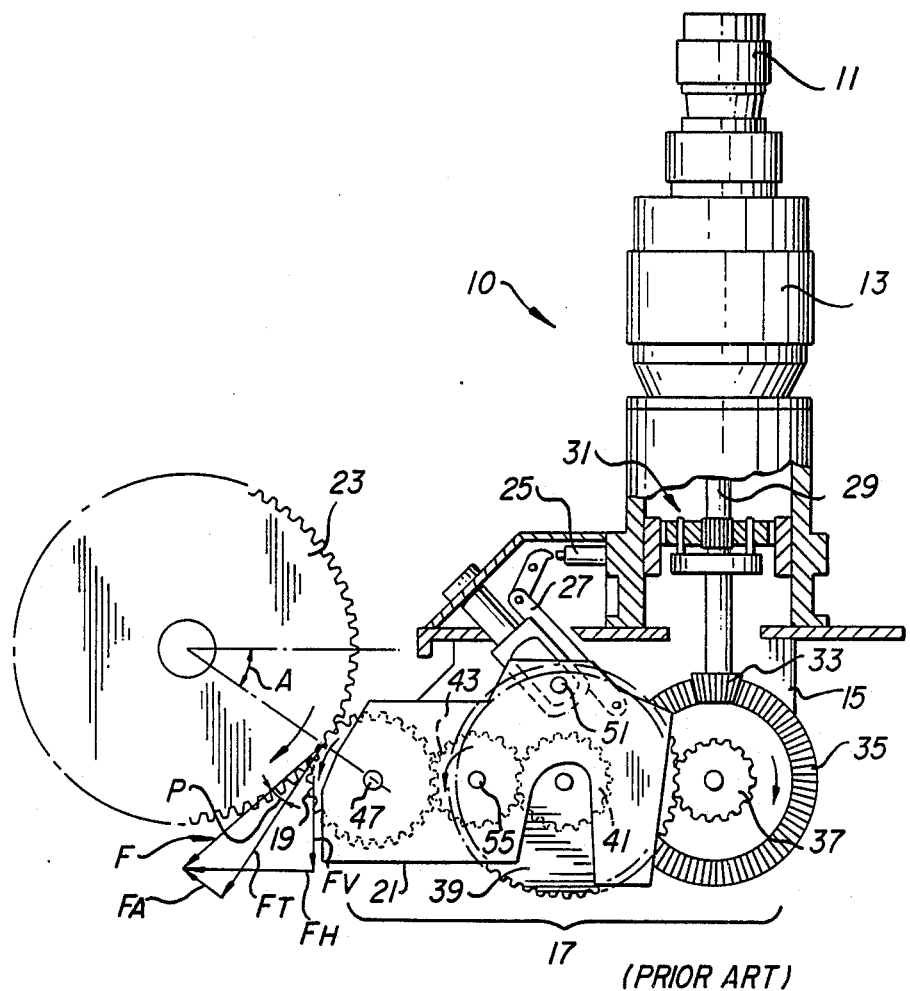

A turning gear 10 according to the prior art includes a small torque pre-engagement motor 11 which may be mounted in tandem or series with a larger main drive motor 13 on a frame 15 and driving a gear train 17. The gear train terminates in a clash pinion 19 mounted on a movable carriage 21. The clash pinion selectively engages a bull gear 23 which is mounted on the turbine rotor 24. A fluid pressurized cylinder 25 actuates a linkage 27 for pivoting the carriage clockwise so that the clash pinion may engage the rotor bull gear 23.

The precise type of driving motor and gear train is not material to the present invention, since it may be desirable in some cases to substitute only one drive motor and to rearrange the gear train. However, a suitable drive motor and gear train arrangement is disclosed in the aforementioned U.S. Pat. No. 3,919,894 issued Nov. 18, 1975, which is incorporated herein by reference. In that patent, pre-engagement motor 11 and main drive motor 13 have a common output shaft 29 driving a planetary system 31 which drives a bevel output gear 33 at its output end. Bevel gear 33 drives a bevel reduction gear 35 which is coaxial with a pinion 37. Pinion 37 meshes with and drives a second reduction gear 39. The second reduction gear is coaxial with a pinion 41 which drives pinion 43 which drives and is continuously engaged with clash pinion 19.

When the turning gear 10 is engaged by actuating the fluid cylinder 25 and linkage 27 to pivot the carriage 21 clockwise, the engaged turning gear pinion 19 creates a tooth force loading which is in a direction to create an upward (clockwise) force on carriage 21 to hold the turning gear engaged. The torque applied to the turbomachine rotor by the turning gear is equal to the tangential force at the point of contact between the drive pinion 19 and the bull gear 23, shown as force vector $F_r$, times the radius of the bull gear. The total force applied to the bull gear 23 must be greater than $F_r$ because it is applied at an angle from $F_r$ known as the pressure angle of the gear teeth. If the gear tooth pressure angle is 20 degrees, which is the case for a commonly used standard gear tooth form, then the value of F equals $1.064F_r$. The angle between vectors F and $F_r$ is the gear tooth pressure angle and is indicated as P on the drawing. The angle between the horizontal and the line extending through the axes of rotation of gears 19 and 23 is some other angle A which is selected to hold the pinion 19 in engagement, but to allow the gears to disengage when the speed of the turbine rotor exceeds the speed of the turning gear, allowing carriage 21 to pivot counter clockwise out of engagement. Angle A in the prior art device of FIG. 1 is approximately 34 degrees.

The turning gear force vector F may also be broken down into horizontal and vertical vector components $F_H$ and $F_v$ respectively. Vector $F_v$ is in a downward direction, which adds to the apparent weight of the turbomachine rotor in its bearings when the turning gear 10 is engaged, causing a higher static friction force to be overcome by the turning gear 23.

Figure 2:
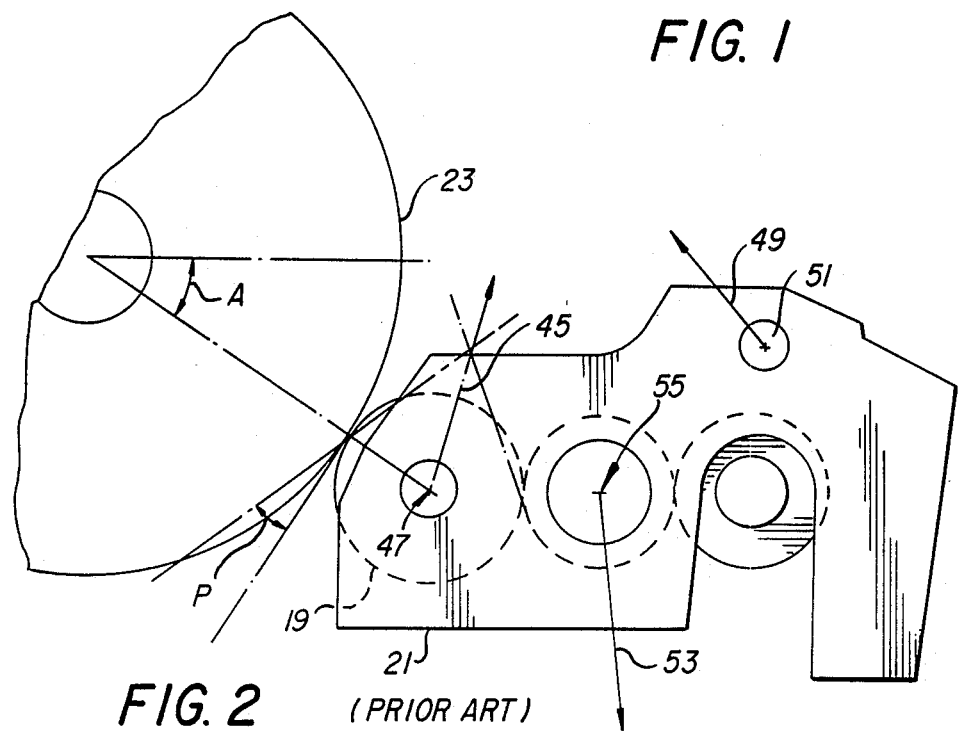

Referring to the schematic diagram of FIG. 2, a force vector diagram of reaction forces on the prior art carriage 21 is shown for the example given in FIG. 1. A force vector 45 acts through the axis of rotation 47 of pinion 19; a force vector 49 acts through the linkage pin 51; and a vector 53 acts through the common axis of rotation 55 of pinion 43 and pivot axis of carriage 21. The vectors have the values indicated on the diagram as referred to an arbitrary value of $F_r$, with the result that large bending forces are imposed on carriage 21 and a large force of $2.62F_r$ is transmitted to the frame. The turning gear and its frame and the gear axles must be sufficiently strong and rigid to withstand these forces without flexing or distorting so as to cause misalignment and resultant damage to the gears.

Figure 3:
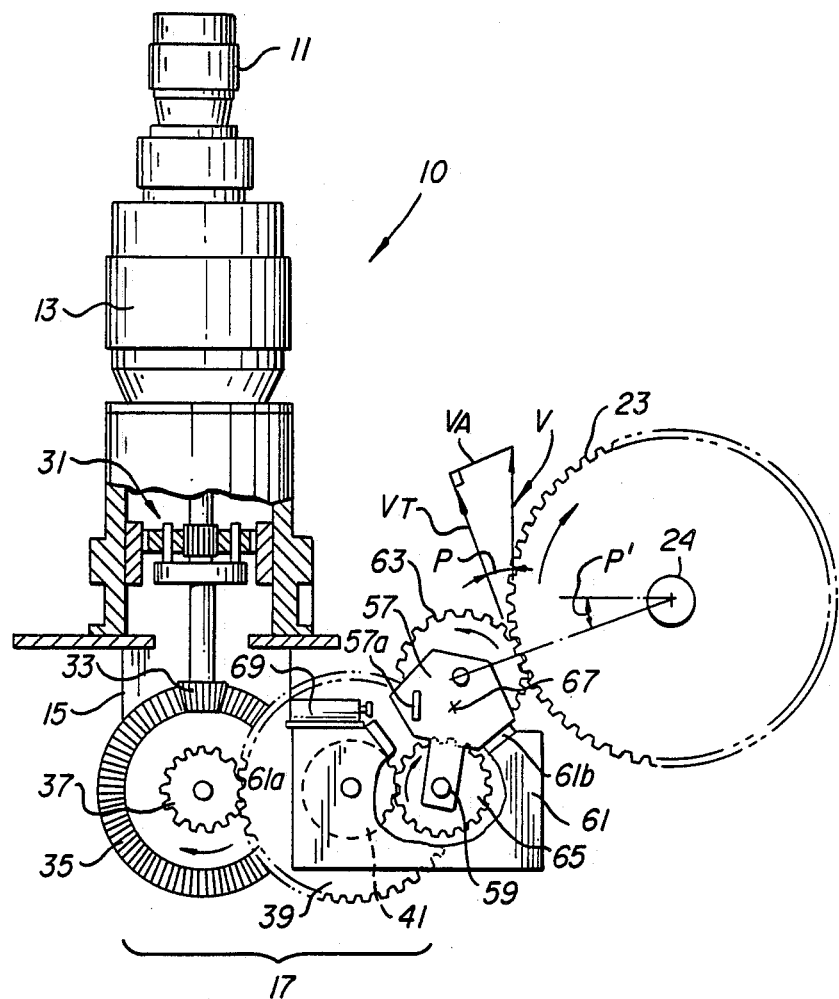

Referring now to FIG. 3 of the drawing, an improved turning gear engagement device is shown in accordance with the present invention. A turning gear 10, which may have components and gear train members identical to those previously described in FIG. 1 is shown, wherein elements which are identical have the same reference numerals as in FIG. 1. A movable carriage 57 is pivotably mounted on an axis 59, which is carried by an extension 61 of the frame 15, pivoting movement being limited in either direction by stops 61a, 61b. Rotatably mounted in the upper end of carriage 57 is a first pinion or clash pinion 63, which is continuously engaged with a second pinion 65 which, in turn, meshes with the previously described pinion 41. The axis of rotation of the second pinion 65 is common with the pivoting axis of carriage 57.

Carriage 57 is shown in the engaged position, pivoted against stop 61b when so engaged A line passing through the axis of rotation of first pinion 63 and the axis of rotation of bull gear 23 form an angle P. below the horizontal, which is selected to be substantially equal to the pressure angle P designed for the gear teeth. As will be explained, this arrangement creates a substantially vertical and upward force on the rotor.

Further in accordance with the present invention, the carriage 57 is designed such that its center of gravity, designated by reference numeral 67 is above and slightly to one side of a vertical line passing through the axis of rotation 59 of the second pinion 65 when first pinion 63 is engaged. Also when the first pinion 63 is engaged, the force on the teeth of bull gear 23 acting through the designed pressure angle results in an upward vector V which is substantially vertical Vector V has a tangential force vector component $V_r$. The torque on the bull gear is equal to $V_r$ times the radius of the bull gear 23. Since the gear tooth pressure angle P and the selected angle of the first pinion axis of rotation P' below the horizontal line are the same, vector V has no horizontal component.

When carriage 57 is pivoted counter-clockwise to rest against stop 61a, its center of gravity 67 is above and to the left of a vertical line through axis 59. Thus, carriage 57 has only two mechanically stable positions, that is resting against either stop 61a or stop 61b. It remains to note that when in the disengaged position, a fluid pressure cylinder 69 cooperates with an abutment 57a on carriage 57, whereby actuation of cylinder 69 will pivot carriage 57 clockwise into an engaged position.

Figure 4:
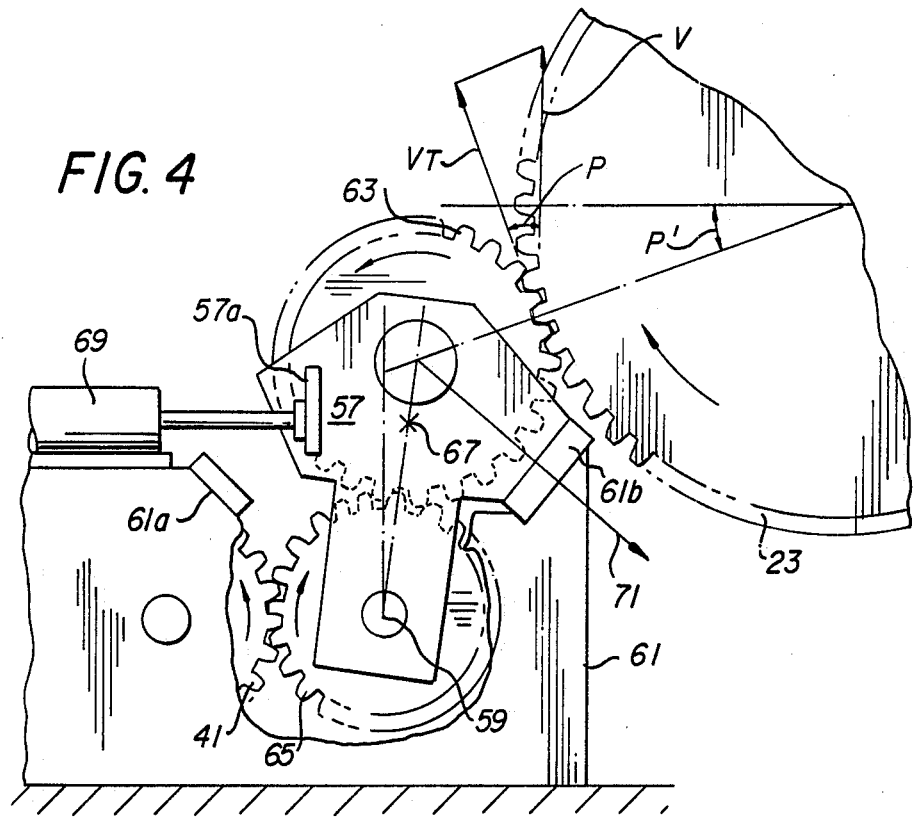
Figure 5:
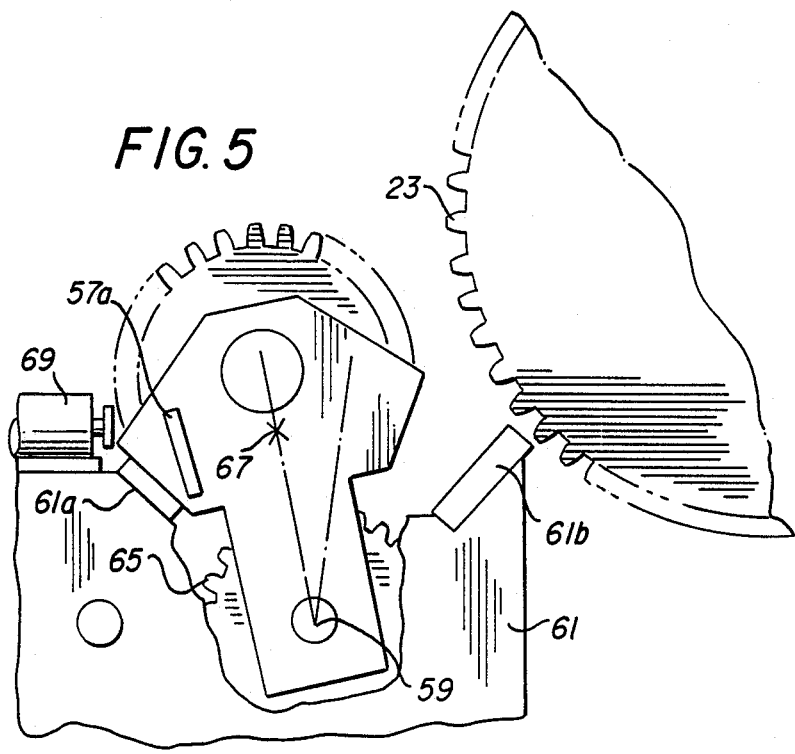

FIGS. 4 and 5 are enlarged schematic views of the carriage shown in engaged and disengaged positions respectively. In FIG. 4, assuming that the axis of rotation of pinion 63 is disposed at an angle P' selected to be substantially equal to the gear tooth pressure angle of 20 degrees, the entire force exerted by the turning gear on the bull gear 23, represented by vector V is vertically upward. This maximizes the uPward force on the rotor and therefore minimizes the torque required to break away the rotor of the turbomachine and the reaction force on the turning gear. A comparison has been made with the prior art turning gear for a typical large turbomachine. Referring to the tangential force between the clash pinion and bull gear in the prior art design of FIG. 1 as $F_r$, the tangential force component in FIG. 4 represented by vector $V_r$ is $0.79 F_r$. In other words, approximately 21 percent less torque is required to breakaway the rotor with the present invention. This result is somewhat dependent on the coefficient of friction between the rotor and its bearings and on the size of the bull gear; however, it is independent of the weight of the rotor.

More important is the fact that the total external force on the turning gear assembly has no horizontal component, now being vertically downward and transmitted to the foundation in direct bearing by the frame extension portion 61. This is the most desirable form of loading and essentially eliminates all movement and distortion.

The force on carriage 57 from the drive pinion is represented by force vector 71. Since the total force on the carriage 57 is applied in direct bearing to stop 61b, there is no bending load on the carriage and no load imposed by the carriage on the rotating shaft of pinion 65.

The primary advantages of the present invention are that, by locating the turning gear assembly on the upward-moving side of the bull gear, and properly designing the carriage and locating the axes of rotation of the first and second pinions, the vertical force on the bull gear reduces the required starting torque, and also reduces the distorting forces on the carriage and turning gear frame. Of course, some range of variation is permissible on either side of the gear tooth pressure angle in order to still substantially achieve the advantages of the present invention. It is desired to secure in the appended claims all such variations and modifications as fall within the true spirit and scope of the invention.

I claim:

1. An improved turning gear apparatus for rolling a turbomachine rotor by selectively engaging a bull gear on the turbomachine rotor, said turbomachine rotor and said bull gear having a horizontal rotor axis of rotation, said turning gear apparatus including a stationary frame mounted adjacent the bull gear,
   a carriage pivotally mounted to the stationary frame on a pivoting axis,
   a first pinion rotatably mounted on said carriage on a first axis of rotation,
   a second pinion continuously engaging siad first pinion and mounted to the stationary frame on a second axis of rotation which is coaxial with said carriage pivoting axis,
   a gear train mounted to the stationary frame and engaging said second pinion, and
   a turning gear motor for rolling the turbomachine rotor through the gear train and first and second pinions, wherein said improvement comprises:
   a portion of the stationary frame supporting said carriage on the side of said bull gear which rotates in an upward direction, said frame portion and said carriage locating said first and second axes of rotation such that when said first pinion engages siad bull gear, the force exerted on said bull gear by said first pinion is substantially in a vertical and upward direction relative to the horizontal rotor axis.

2. The improvement according to claim 1, wherein said first axis of rotation is disposed such that a line extending between it and the horizontal rotor axis of rotation when said first pinion engages said bull gear forms a selected angle with a horizontal line, siad selected angle being substantially equal to a pressure angle of the first pinion and bull gear teeth.

3. The combination according to claim 1, wherein said frame portion includes a first stop limiting the pivoting movement of said carriage in an engaged position and a second top limiting the movement of said carriage in a disengaged position, said carriage and first pinion together having a center of gravity which is located above and on either side of a vertical line through the second axis in the respective engaged and disengaged positions, whereby said carriage is mechanically bi-stable.

4. The combination according to claim 3, further including means for pivoting said carriage from a disengaged position into an engaged position.

5. In a turning gear apparatus for rolling a turbomachine rotor mounted for rotation about a first horizontal axis by selectively engaging a bull gear mounted on the rotor with a driven pinion mounted on a pivotally movable carriage for rotation about a second horizontal axis, the improvement comprising:
   a frame portion supporting the carriage on a side of the bull gear which normally rotates in an upward direction, the first and second horizontal axes located such that, when the pinion engages the bull gear, force exerted by said pinion on siad bull gear is substantially in a vertically upward direction.

6. The improvement according to claim 5, wherein said first axis of rotation is disposed such that a line extending between it and the first horizontal axis when said pinion engages said bull gear forms a selected angle with a horizontal line, said selected angle being substantially equal to a pressure angle of the first pinion and bull gear teeth.

7. The combination according to claim 6, further including means for pivoting said carriage from a disengaged position into an engaged position.

8. The improvement according to claim 5, wherein said frame portion includes a first stop limiting the pivoting movement of said carriage in an engaged position and a second stop limiting the movement of said carriage in a disengaged position, said carriage and pinion together having a center of gravity which is located above and on either side of a vertical line through the second axis in the respective engaged and disengaged positions, whereby said carriage is mechanically bi-stable.

9. Turning gear apparatus for rolling a turbomachine rotor mounted for rotation about a fist axis comprising: a bull gear mounted on the turbomachine rotor; a stationary frame mounted adjacent said bull gear; a carriage pivotally mounted to said frame; a pinon rotatably mounted on said carriage about a second axis of rotation, said pinion being selectively engageable with said bull gear; wherein said frame includes a first stop limiting the pivoting movement of the carriage in an engaged position and a second stop limiting movement of the carriage in a disengaged position, the carriage and pinion together having a center of gravity which is located above and on either side of a line through the second axis of rotation in the respective engaged and disengaged positions, the carriage being mechanically bi-stable whereby said apparatus rotates siad turbomachine rotor to prevent uneven cooling of a turbomachine.

* * * * *